March 8, 1932.  W. B. CLIFFORD  1,848,319
METHOD AND APPARATUS FOR EXHAUSTING AND SEALING METALLIC BELLOWS
Original Filed Dec. 1, 1926  2 Sheets-Sheet 1
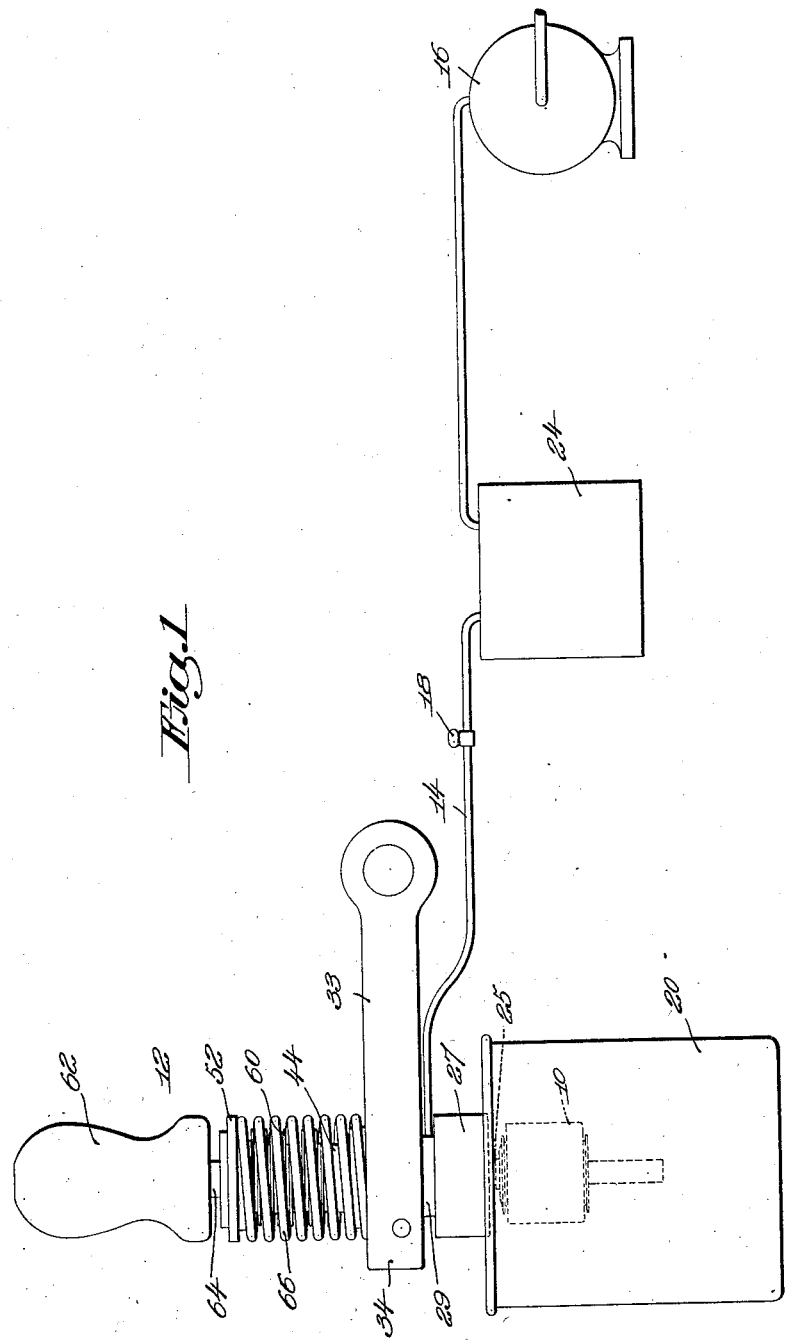

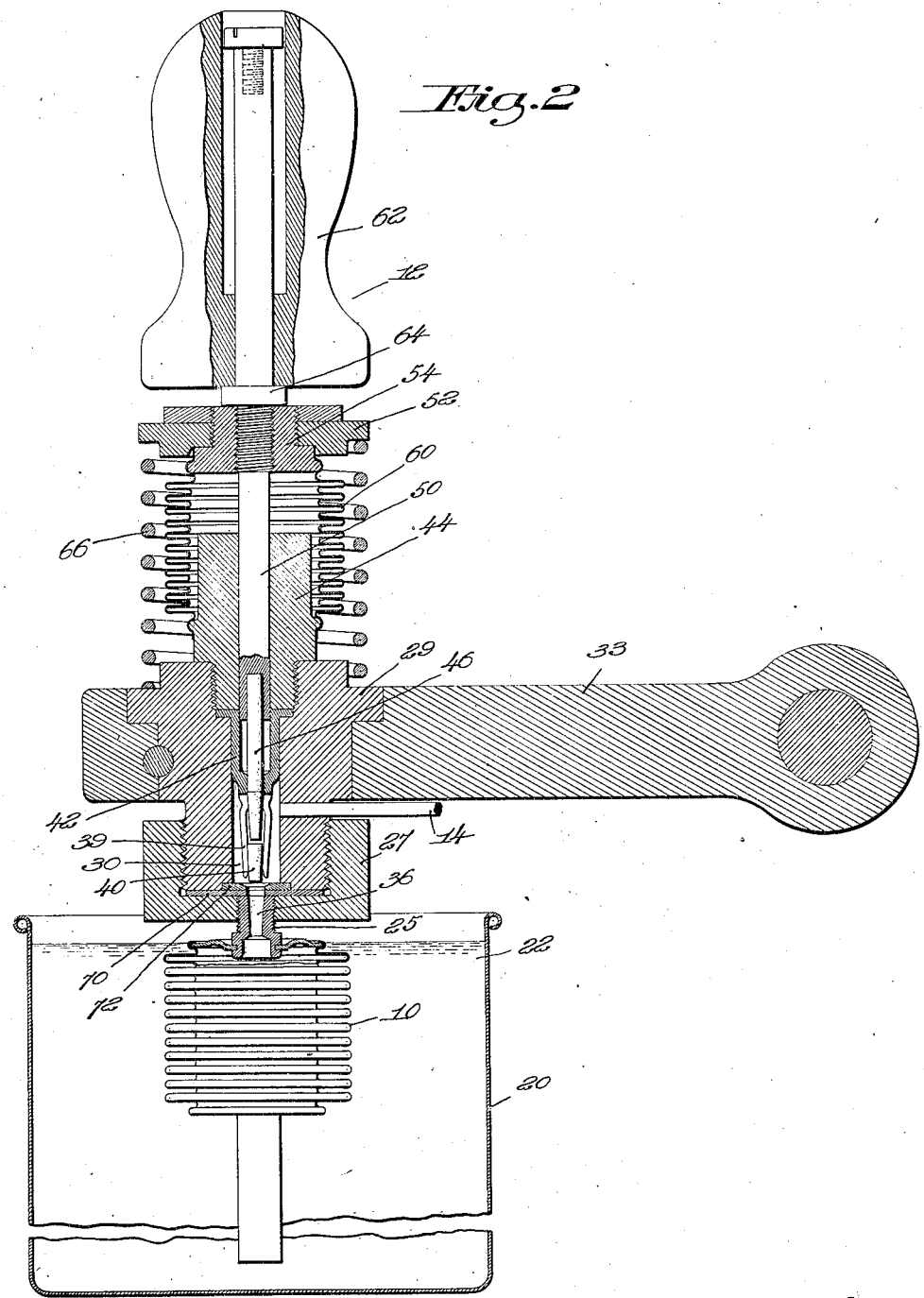

Patented Mar. 8, 1932

1,848,319

UNITED STATES PATENT OFFICE

WALTER B. CLIFFORD, OF BOSTON, MASSACHUSETTS, ASSIGNOR TO CLIFFORD MANUFACTURING CO., OF BOSTON, MASSACHUSETTS, A CORPORATION OF DELAWARE

METHOD AND APPARATUS FOR EXHAUSTING AND SEALING METALLIC BELLOWS

Application filed December 1, 1926, Serial No. 152,052. Renewed January 20, 1932.

The present invention relates to a method and apparatus for filling and hermetically sealing containers under pressures less than atmospheric, and is more particularly designed for the filling and sealing of metallic bellows employed in temperature controlled apparatus. According to the present invention, a formed bellows completely sealed, except for a vent or passage, is connected to a vacuum source with the interior of the bellows communicating therewith through the vent. The operation of the vacuum pump thereupon establishes a pressure less than atmospheric in the bellows, this pressure being determined by the operation of the pump. Prior to or during the application of the vacuum, either liquid or liquid vapor is introduced into the interior of the bellows. In the preferred form of the invention a measured quantity of vaporizable liquid of the desired character is inserted in the bellows before connection to the vacuum line. Thereafter, upon establishing a vacuum within the bellows, the air is withdrawn and displaced by liquid vapor which completely fills the bellows. Inasmuch as the liquids commonly employed boil at the low pressure to which the bellows is subjected, it may be desirable to expose the bellows exteriorly to a refrigerating solution or to maintain a low temperature of the bellows in any desired manner in order to prevent or minimize the boiling of the contained liquid. After establishing the desired vacuum within the interior of the bellows and withdrawing the air therefrom, a tapered plug is forcibly inserted within the vent without previously cutting off the vacuum, sealing the bellows at the predetermined low pressure, and permitting the bellows assembly to be thereupon disconnected from the vacuum line. The seal created by this plug may be, and preferably is, augmented by the employment of solder covering the joining surfaces of the plug and bellows to hermetically seal the opening and insure against leaking. I have found in actual practice that with liquids ordinarily employed within the bellows, vapor is not given off at a sufficiently rapid rate to seriously reduce the quantity of liquid, even though no attempt is made to reduce the temperature of the bellows substantially below room temperature. I therefore do not deem it essential that the bellows be cooled artificially during the exhaustion. If so desired, means may be interposed in the vacuum line for condensing and collecting the liquid vapor in order that it may be conserved and reused. The provision of such a condenser is more particularly advisable in the event that the bellows are not artificially cooled during the exhaustion.

For the purpose of forcibly inserting a sealing plug without disconnecting the bellows from the vacuum line, I have devised a relatively simple and efficient form of apparatus comprising generally a clutch for holding the plug suspended above the vent opening of the bellows, means for forcibly ejecting the plug into the vent, and means for hermetically sealing the holding and operating mechanism for the plug to prevent leakage from without into the space communicating with the vacuum line.

In the accompanying drawings illustrating the preferred form of my invention,

Fig. 1 represents a diagrammatic view of a system which may be conveniently employed for practising my improved method; and Fig. 2 is a section in elevation of that portion of the system designed for the insertion of the sealing plug in the vent.

In the system shown in the illustrated embodiment of the invention, the formed bellows, indicated generally at 10, is threaded into the sealing plug device, indicated generally at 12, which is connected with a vacuum line 14. This vacuum line communicates with a vacuum pump 16 which may be of any well-known type, as for example, a rotary pump. The vacuum may be conveniently controlled by a hand-operated pinch clamp 18 which engages a flexible rubber hose forming a part of the vacuum line to control communication between the interior of the bellows and the vacuum source. Bellows of this character are quite generally filled with alcohol, or some similar substance, which boils below boiling point of water. Inasmuch as the vacuum to which the interior of the bellows is subjected may approximate 29½ inches of mercury, it will be evident that most, if not all, of these liquids are boiled freely under this low pressure. In order to prevent or minimize this boiling action, it may be desirable to subject the bellows to an artificial cooling action which will lower the temperature of the bellows and the contained liquid sufficiently to prevent or minimize boiling at the low temperature. This may be conveniently and simply accomplished by providing a receptacle 20 containing brine solution 22 cooled either by melting ice or refrigerating pipes. Although such an apparatus is desirable, nevertheless it has been found in many cases that it is not essential as the time required to exhaust and seal the bellows is insufficient for any considerable quantity of the contained liquid to escape. If it is desired to recapture that portion of the liquid escaping in the form of vapor in the vacuum line, a condenser, indicated at 24, may be conveniently employed, such a condenser being artificially cooled to a point where the vapor under the given pressure will condense and be collected in a manner to permit re-use. Obviously the necessity for a condenser is greater if the refrigerating bath is eliminated than otherwise.

Referring particularly to Fig. 2, in which is shown the apparatus for sealing the bellows under vacuum, it will be observed that the formed bellows 10 is connected through the medium of the threaded stud 25 with a threaded opening formed in a cap 27. This cap is threaded upon the lower end of a head 29 which is provided with an interior chamber 30 communicating with the vacuum line 14 when the control valve is opened. As will be evident from an inspection of the drawing, the sealing device is supported upon an arm 33 having a hub 34 surrounding the head 29 to permit the device as a whole to be swung angularly. Positioned within the chamber 30 and directly in line with the vent 36 formed in the stem 25 is a spring jaw clutch 39 which resiliently engages and holds a tapered sealing plug 40. The spring jaw clutch is formed upon the lower portion of a tubular sleeve 42 which is received within the upper portion of the chamber and held in place by a threaded plug or head 44. Sliding within the sleeve 42 and the clutch jaws 39 is an elongated pin 46. This pin, as will be evident, is closely guided by the sleeve and engages behind the plug 40 in a manner to forcibly eject this plug and drive it into the vent 36 immediately therebeneath. The pin 46 is connected at its upper portion to a sliding rod 50 which is in turn connected with a head 52 through a threaded bushing 54. The sliding rod and the interior of the chamber 30 are protected against leakage of atmospheric pressure through a bellows 60 connected at one end to the bushing 54 and at its opposite end to the plug 44, the bellows serving to hermetically seal the space surrounding the rod but at the same time permitting relative movements of the head 54 and plug 44 toward and from one another. The necessarily abrupt movements are imparted to the rod by a weight 62, slidingly supported upon the upper extended end of the rod and serving when lifted and dropped to forcibly depress the rod and connected head through engagement of the bottom of the weight 62 with the shoulder 64 formed on the rod. This depression of the rod through the pin 46 drives the sealing plug into the vent and effectually seals the bellows without disturbing the connection between the bellows and the vacuum line. It will be evident that the downward movement of the head 52 is limited by engagement of the upper face of the plug 44, which also serves as a guide for the rod 50. Inasmuch as the space enclosed by the bellows may be at pressures substantially less than atmospheric, means must be provided to prevent collapse of the bellows and depression of the head 52 under the action of the vacuum. To this end a supporting spring 66 is interposed between the chamber head 29 and the peripheral portion of the head 52, and is of sufficient strength to support the head and connected parts in the elevated position shown in the drawings, this spring resisting the weight of the parts in addition to the vacuum tending to collapse the bellows. Upon exhaustion and sealing of the bellows with the plug 40, the vacuum line is cut off from the chamber and the bellows disconnected by unthreading the stem. It will be evident that, when in position, the connection between the stem of the bellows and the chamber is sealed by engagement of the end of the stem with a flexible rubber gasket 70 interposed between the cap 27 and a supporting disk or washer 72 seated in the head 29.

Prior to the insertion of the next succeeding bellows, a new sealing plug is inserted between the spring jaws of the clutch, which may be accomplished by a simple form of tool having a holding recess with an ejector for thrusting the plug upwardly between the jaws. Thereafter the formed bellows is threaded in place and the cycle of operations repeated.

What is claimed is:

1. A method of charging and sealing metallic bellows which consists in partially filling a previously formed and sealed bellows unit, except for the provision of a communicating vent, connecting the interior of the bellows from the vent to a vacuum source, exhausting the interior of the bellows to a low pressure through the source, maintaining the bellows and contents artificially cool during exhaustion, and finally sealing the vent.

2. An apparatus for exhausting and sealing bellows comprising a chambered head, means for connecting a bellows with a vent opening to the head with the opening in communication therewith, a clutch positioned within the chamber for retaining a sealing plug in a stationary position beyond and in alignment with the vent opening of the bellows, a vacuum source communicating with the chamber to exhaust air from the interior of the bellows connected thereto, an ejector member movable within the chamber in alignment with the sealing plug and extending without the chamber, a collapsible bellows for hermetically sealing the ejector, and means for imparting a hammer blow to the ejector to dislodge the seal from the clutch and forcibly drive it into the vent opening.

3. An apparatus for exhausting and sealing bellows comprising a head provided with a chamber, a vacuum source communicating with the chamber, means for connecting the vent opening of a bellows to the chamber, means for supporting a sealing plug in the chamber in alignment with the vent opening, means for delivering a hammer blow for forcibly inserting the sealing plug into the opening, and collapsible bellows for hermetically sealing the sealing plug-inserting means against leakage of atmospheric pressure into the chamber.

4. An apparatus for exhausting and sealing bellows comprising a head provided with a chamber, connections between the chamber and a source of vacuum, means within the chamber for detachably holding a sealing plug, a sliding ejector for forcibly ejecting the plug from the holding means, a bellows for hermetically sealing the sliding ejector against leakage of atmospheric pressure while permitting sliding movement thereof, and means without the seal for operating the ejector and means for yieldingly supporting the ejector in elevated position against the pull of vacuum tending to depress the ejector.

5. Apparatus for exhausting and sealing bellows comprising a head provided with a chamber, a member connected to the head and provided with a restricted opening adapted to secure a bellows vent thereto, a vacuum line communicating with the chamber in the head, a clutch having resilient jaws positioned within the chamber beyond and in line with the opening for resiliently holding a tapered metal sealing plug, an ejector rod slidingly supported in the head beyond the clutch and movable into operative position between the jaws thereof to engage and eject a plug, the ejector rod projecting without the head, means for yieldingly retaining the ejector rod withdrawn in an inoperative position, means for sealing the ejector rod against leakage into or from the chamber during movement thereof, and means engaging with the projection of the ejector rod outside of the head for imparting a forcible blow thereto in a direction to move the ejector rod into engagement with the plug and forcibly deliver the plug into a vent opening formed in the neck of a bellows engaged and secured by the opening.

WALTER B. CLIFFORD.